United States Patent
Kosaka

(10) Patent No.: US 7,382,118 B2
(45) Date of Patent: Jun. 3, 2008

(54) DEVICE FOR DETECTING THE WHEEL SPEED

(75) Inventor: Shin Kosaka, Toyohashi (JP)

(73) Assignee: Denso Corporation, Kariya (JP)

( * ) Notice: Subject to any disclaimer, the term of this patent is extended or adjusted under 35 U.S.C. 154(b) by 21 days.

(21) Appl. No.: 11/052,238

(22) Filed: Feb. 7, 2005

(65) Prior Publication Data

US 2005/0179317 A1    Aug. 18, 2005

(30) Foreign Application Priority Data

Feb. 17, 2004    (JP)    ............................. 2004-039283

(51) Int. Cl.
*G01P 3/42*    (2006.01)

(52) U.S. Cl. ...................................................... 324/160

(58) Field of Classification Search ................ 324/166, 324/173, 207.12, 160, 163; 73/448, 499, 73/514.39; 340/441, 448; 342/104; 361/236; 700/141, 142, 145–148

See application file for complete search history.

(56) References Cited

U.S. PATENT DOCUMENTS 6,674,279 B2 *    1/2004    Manlove et al. ............ 324/166

FOREIGN PATENT DOCUMENTS

| JP | 7-248234 | 9/1995 |
|----|----------|--------|
| JP | 9-272421 | 10/1997 |
| JP | 10-132835 | 5/1998 |
| JP | 2000-002553 | 1/2000 |
| JP | 2001-021574 | 1/2001 |
| JP | 2002-278620 | 9/2002 |

* cited by examiner

*Primary Examiner*—Reena Aurora
(74) *Attorney, Agent, or Firm*—Harness, Dickey & Pierce, PLC

(57) ABSTRACT

A device for detecting a wheel speed includes a comparator that converts a sine-wave output signal $S_p$ of a wheel speed sensor into a binary wheel speed signal $S_b$. Here, the threshold value $V_{th}$ of the comparator is continuously increased in response to a period in which the sine-wave output signal $S_p$ is greater than the threshold value $V_{th}$, and is continuously decreased in response to a period in which the sine-wave output signal $S_p$ is smaller than the threshold value $V_{th}$.

8 Claims, 3 Drawing Sheets

DEVICE FOR DETECTING THE WHEEL SPEED

CROSS REFERENCE TO RELATED APPLICATION

This application is based upon, claims the benefit of priority of, and incorporates by reference the contents of Japanese Patent Application No. 2004-39283 filed on Feb. 17, 2004.

FIELD OF THE INVENTION

The present invention relates to a wheel speed sensor for detecting the speed of a wheel when a vehicle is traveling.

BACKGROUND OF THE INVENTION

Recently, electronic devices using a CPU and sensors have been mounted on many vehicles to meet the social needs for advanced intelligence and safety for automobiles. In particular, a wheel speed sensor has been used as a basic sensor for enhancing various controls, intelligence and safety for vehicles. A device for detecting the wheel speed that uses the wheel speed sensor must use a filter. The frequency characteristics of a low-pass filter for processing analog signals must be precisely determined. Therefore, it is important to precisely set a circuit constant that is determined by a capacitor and a resistor. To decrease the size, the device for detecting the wheel speed must be realized in the form of an IC. Among the circuit constants in the filter, the resistors can be formed in the form of a MOS integrated circuit in small sizes, but the capacitors cannot be highly precisely constituted in the MOS integrated circuit. Moreover, their sizes cannot be decreased as that of the resistors. In the conventional devices, therefore, capacitors having precise capacitances are attached as external parts of an IC to solve the problem of precision in the filter circuit constant. A device for detecting the wheel speed having the above circuit constitution has been disclosed in JP-A-2000-2553.

In the above device for detecting the wheel speed, too, however, capacitors have been attached to the outer side for determining the constant of the filter circuit. Therefore, the device is not integrated in a perfect all-in-one form, and the size cannot be decreased any more. Moreover, the capacitors attached to the outer side cause an increase in the number of places of physical connection such as soldering. This affects reliability and makes it difficult to decrease the cost since the capacitors attached to the outer side must have highly precise capacities.

SUMMARY OF THE INVENTION

Accordingly, it is an object to provide a device for detecting the wheel speed featuring a further decrease in the size of the device and a further increase in the reliability.

The device for detecting the wheel speed comprises signal processing means having conversion means for converting a sine-wave output signal of a wheel speed sensor into a binary signal, and a microcomputer that receives an output signal converted through the signal processing means, wherein the signal processing means has threshold value-determining means that determines a threshold value of the conversion means based on an output of a digital filter.

Thus, an analog sine-wave output signal is processed through a digital filter without using an analog filter, thereby making it possible to integrate the device for detecting the wheel speed into one without requiring a capacitor attached to the outer side. Thus, the size is further decreased, and the productivity and reliability are further improved.

In the device for detecting the wheel speed, further, it is desired that the threshold value-determining means continuously increases the threshold value in response to a period in which the sine-wave output signal is greater than the threshold value, and continuously decreases the threshold value in response to a period in which the sine-wave output signal is smaller than the threshold value.

Therefore, even when high-frequency noise such as device noise or ignition noise is superposed on the analog sine-wave output signal of the wheel speed sensor, the binary wheel speed signal produced by the device for detecting the wheel speed is not disturbed by noise, and a highly stable signal is obtained.

Further, in the device for detecting the wheel speed of the invention, the digital filter can be so constituted as to fix the binary signal when the sine-wave output signal is passing through a threshold value insensitive zone determined by the threshold value.

Even when the high-frequency noise has a large level, therefore, no disturbance such as chattering occurs at the rising edge or the falling edge of the binary wheel speed signal, and a highly precise output signal is obtained.

Further, in the device for detecting the wheel speed, there can be provided open-circuit detection means for detecting an open state in the connection between the wheel speed sensor and the signal processing means.

This makes it possible to reliably detect connection failure of an open-circuited mode between the wheel speed sensor and the device for detecting the wheel speed.

Further, in the device for detecting the wheel speed, there can be provided short-circuit detection means for detecting a grounded state in the connection between the wheel speed sensor and the signal processing means.

This makes it possible to reliably detect the connection failure of a short-circuited mode between the wheel speed sensor and the device for detecting the wheel speed.

Further, the device for detecting the wheel speed of the vehicle can be constituted to include:

a first comparator having the threshold value determined by a threshold value signal of the digital filter, and producing a first output during a period in which the sine-wave output signal of the wheel speed sensor is greater than the threshold value;

a second comparator for producing a second output during a period in which the sine-wave output signal of the wheel speed sensor is smaller than the threshold value;

an up/down counter for counting up the outputs based on the clock signals having a predetermined clock frequency while the first output is being produced, and for counting down the outputs based on the clock signals while the second output is being produced, to produce a parallel binary count code corresponding to the counted value;

a D/A converter for producing the threshold value signal for determining the threshold value of the comparator in response to the input of the parallel binary count code; and another digital filter having a logic circuit for operating a logic of the first output and of the second output, and for producing a binary wheel speed signal in which the high level and the low level are equalized in time.

Therefore, during the time in which the sine-wave output signal of the wheel speed sensor is greater than the threshold value, the threshold value of the comparator is linearly increased, and during the time in which the sine-wave output signal is smaller than the threshold value, the threshold value is linearly decreased. As a result, there is obtained a threshold value representing nearly an average value of the analog output signals of the wheel speed sensor. Thus, there are obtained stable and precise binary wheel speed signals even when the waveforms of the output signals of the wheel speed sensor of, for example, the electromagnetic pickup system, etc. are distorted or the up-and-down amplitude of the signals becomes non-uniform due to the transient traveling state of the vehicle, such as start or stop. Further, the absolute value of the threshold value of the comparator becomes slightly greater than a central value of the output signal near a period in which the polarity +/− of the output signal of the wheel speed sensor varies. Therefore, the operation of the comparator remains stable even when noise is superposed on the output signal of the wheel speed sensor.

Further, in the device for detecting the wheel speed, the binary wheel speed signal can be designed to be a binary signal having a pulse duty defined by a ratio of the high-level continuation time to the pulse period of 50% when the vehicle is traveling at a constant speed.

Accordingly, the binary wheel speed signal produced by the device for detecting the wheel speed can be stably processed by using a control device employing a CPU or the like.

Further, in the device for detecting the wheel speed, the open-circuit detection means can be constituted to produce a binary open-circuit signal when the parallel binary counted code of the up/down counter has reached a maximum value.

Accordingly, the open-circuit detection means that detects the connection failure of the open-circuit mode between the wheel speed sensor and the device for detecting the wheel speed produces a binary open-circuit signal by integrating the output signals of the wheel speed sensor by using the D/A converter. This reliably prevents the superposition of noise on the output signal of the wheel speed sensor and the production of a false signal caused by the EMC electromagnetic interference, and improves the reliability of the device for detecting the wheel speed.

Further, in the device for detecting the wheel speed, the short-circuit detection means can be constituted to produce a binary short-circuit signal when the parallel binary counted code of the up/down counter has reached a minimum value.

Accordingly, the short-circuit detection means that detects the connection failure of the short-circuit mode between the wheel speed sensor and the device for detecting the wheel speed produces a binary open-circuit signal by integrating the output signals of the wheel speed sensor by using the D/A converter. This reliably prevents the superposition of noise on the output signal of the wheel speed sensor and the production of false signal caused by the EMC electromagnetic interference, and improves the reliability of the device for detecting the wheel speed.

Further, in the device for detecting the wheel speed, the digital filter may be provided with a digital low-pass filter of either a finite impulse response (FIR) low-pass filter or an infinite impulse response (IIR) low-pass filter for removing high-frequency components from the binary wheel speed signal.

This makes it easy to realize, by using DSP/CPU, a digital low-pass filter of the FIR system or the IIR system of high performance featuring excellent frequency selectivity, without employing an analog filter the circuit constant of which delicately varies in response to the temperature conditions to affect the performance thereof such as frequency selectivity. As a result, there are obtained highly stable and highly precise binary wheel speed signals.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENT

The best mode of the device for detecting the wheel speed according will now be described with reference to the accompanying drawings. The device for detecting the wheel speed 1 is connected to a wheel speed sensor of, for example, an electromagnetic pickup system, etc. 100 that generates AC signals of a frequency proportional to the rotational speed of a wheel. The AC signals of the wheel speed sensor 100 are input to a signal processing circuit 200 through a sensor input circuit 150 that is constituted by resistors $R_a$, $R_b$ and a capacitor $C_p$ and that also works as a low-pass filter and a bias circuit. A binary wheel speed signal $S_b$ and a binary fault detection signal $S_F$ of the signal processing circuit 200 are input to a micro-processing unit (MPU) 300. The MPU will hereinafter also be referred to as a central processing unit (CPU) 300. The MPU (or CPU) 300 produces the wheel speed signal while detecting a fault in the wheel speed sensor 100 inclusive of the connection between the wheel speed sensor 100 and the device for detecting the wheel speed 1.

Figure 2:
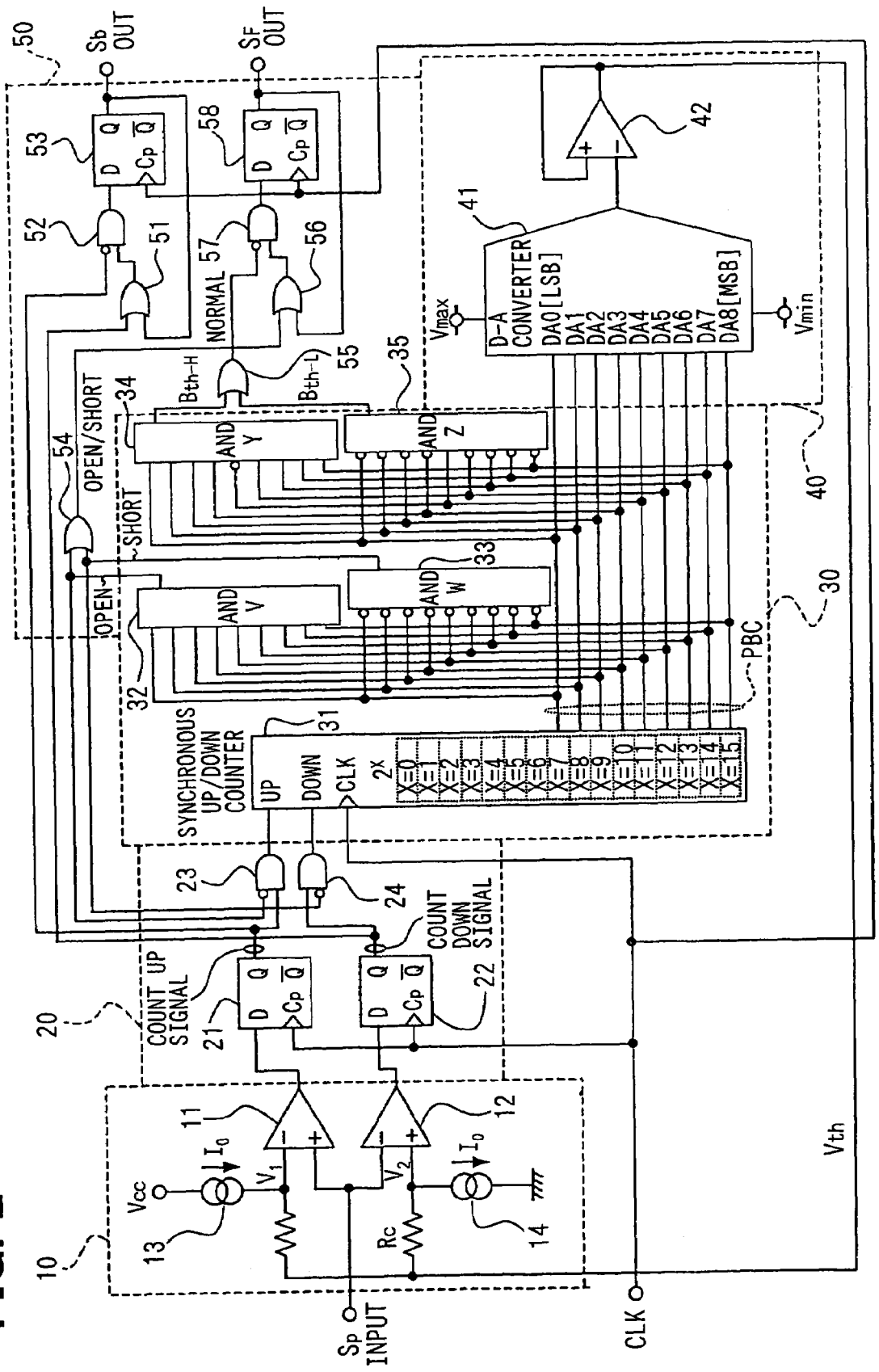
FIG. 2 is a circuit diagram illustrating the constitution of a signal processing circuit in the device for detecting the wheel speed.

Next, the constitution and function of the signal processing circuit 200 in the device for detecting the wheel speed 1 will be described with reference to FIG. 2. The signal processing circuit 200 is constituted by a comparator unit 10 for shaping the waveform of a sine-wave output signal (hereinafter also referred to as "sine-wave wheel speed signal") $S_p$ output by the wheel speed sensor 100, a counter control unit 20 that produces a count-up signal and a count-down signal for controlling the count of a counter unit 30 described below based on the output of the comparator unit 10, the counter unit 30 that receives clock signals CLK, and counts up/down the outputs of the counter control unit 20 to detect a fault of open-/short-circuit mode relying upon the counting, a D/A conversion unit 40 that generates a threshold value signal $V_{th}$ for determining the threshold value of the comparator unit 10 based on a parallel binary count code PBC of the output by the counter unit, and a signal output unit 50 which operates the logic of the output of the counter control unit 20 and the output of the counter unit 30 to produce a binary wheel speed signal $S_b$ and a binary fault detection signal $S_F$.

The constitutions and functions of various portions of the signal processing circuit 200 will now be described below successively. First, the comparator unit 10 receives the threshold value signal $V_{th}$ which is a saw-tooth wave signal shown in FIG. 3 produced by the D/A converter unit 40, to determine threshold values $V_1$ and $V_2$ for the two comparators 11 and 12. The threshold values $V_1$ and $V_2$ are determined to be nearly $V_1 \approx V_{th} + (I_0 - I_{b1})R_c$ - - - (1) and $V_2 \approx V_{th} +$ $(I_0-I_{b2})R_c$ - - - (2), by bias currents $I_{b2}$ and $I_{b2}$ determined by the operating states of the comparators 11 and 12, by a constant-current source 13 having a current $I_0$ connected to a power source $V_cC$ and by a constant-current source 14 to GND and having the current $I_0$, In the formula (1) and (2), the second terms $(I_0-I_{b1})R_c$ and $(I_0-I_{b2})R_c$ are usually smaller than the first term $V_{th}$. Therefore, the two comparators 11 and 12 change their outputs when the since-wave wheel speed signal $S_p$ changes from a positive amplitude over to a negative amplitude. Concretely speaking, the comparator 11 changes the first output for producing a count-up signal that will be described later from a high level into a low level at a moment T1 (precisely, at a moment $S_p=V_2$), and changes the second output for producing a count-down signal that will be described later from the low level into the high level at a moment T2 (precisely, at a moment when $S_p=V_2$). During the period between T1 and T2, as one of ordinary skill would appreciate from a review of FIG. 3, the comparators 11 and 12 are not responsive to the sine-wave wheel speed signal Sp traversing the saw-tooth wave threshold value signal Th. Thus, a threshold value insensitive zone exists between T1 and T2, and also between T3 and T4 and between T5 and T6 as will be appreciated by one of ordinary skill.

Figure 3:
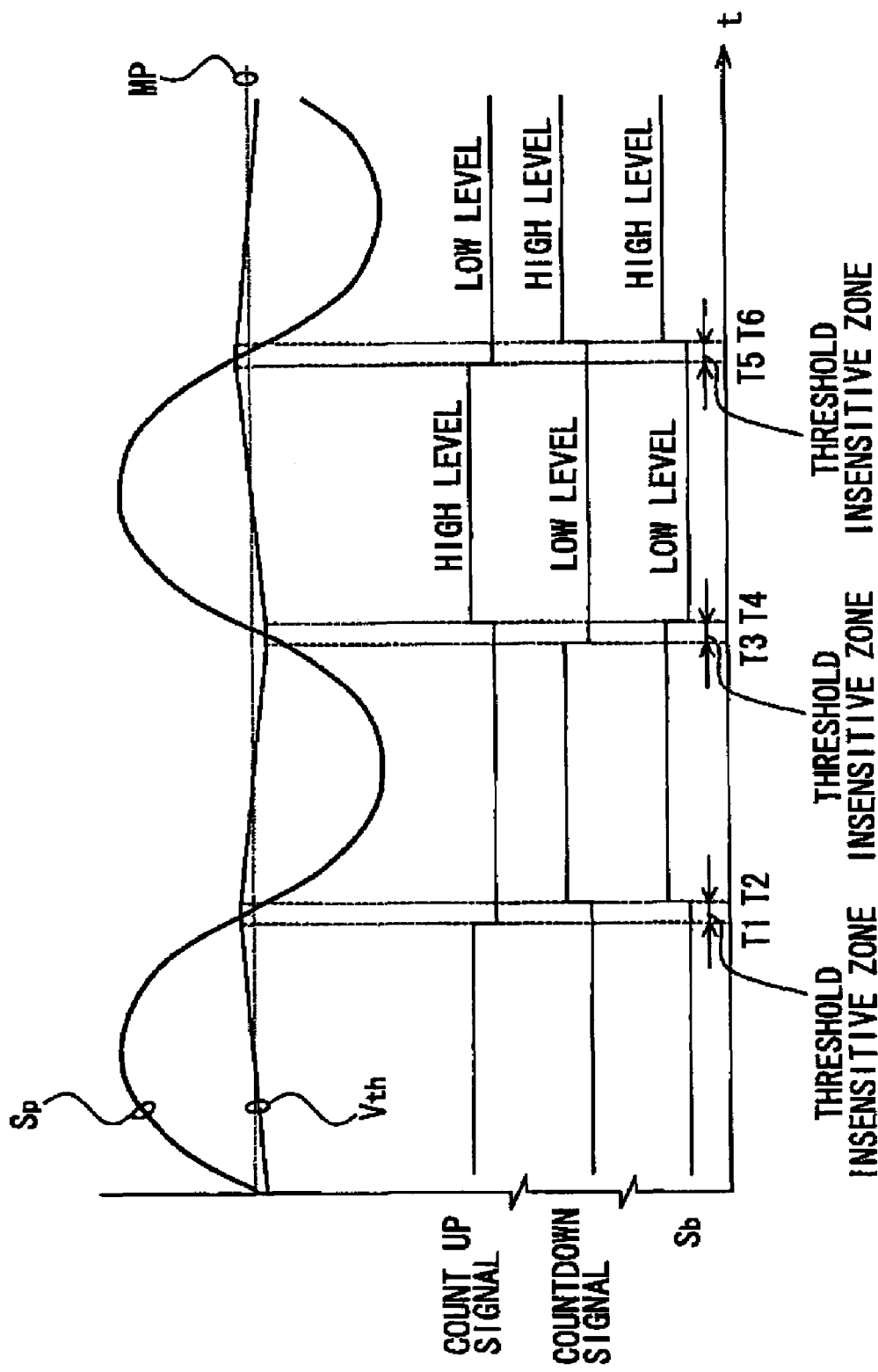
FIG. 3 is a signal timing diagram of principal signals in the signal processing circuit.

Further, the two comparators 11 and 12 change their outputs when the sine-wave wheel speed signal $S_p$ traverses the threshold value signal $V_{th}$ in a state where the sine-wave wheel speed signal $S_p$ changes from a negative amplitude over to a positive amplitude. Closely speaking, the comparator 11 changes the second output from the high level into the low level at a moment T3 (precisely, at a moment when $S_p=V_2$) and changes the first output from the low level into the high level at a moment T4 (precisely, at a moment when $S_p=V_1$) The bias currents $I_{b1}$ and $I_{b2}$ change $(I_{b1}, I_{b2})$ simultaneously with the change in the outputs of the two comparators 11 and 12. Thus, the previously noted threshold insensitive zones are established, for example, between T1-T2. T3-T4, and T5-T6 as shown in FIG. 3. Therefore, the threshold values $V_1$ and $V_2$, too, change instantaneously to produce hystereses $\Delta V_1=\Delta I_{b1}R_c$ - - - (3) and $\Delta V_2=\Delta I_{b2}R_c$ - - - (4) The hystereses prevent the occurrence of chattering on the first output and on the second output despite noise being superposed on the sine-wave wheel speed signal $S_p$ that is traversing the threshold value signal $V_{th}$.

Returning to FIG. 2, described below are the constitution and function of the counter control unit 20. The first output of the comparator 11 is input to a D-type FF (flip-flop) 21 and is latched with a clock signal CLK of a frequency $f_c$ to generate a count-up signal. Likewise, the second output of the comparator 12 is input to a D-type FF (flip-flop) 22 and is latched with the clock signal CLK to generate a count-down signal. FIG. 3 illustrates timings of the count-up signal and count-down signal for the sine-wave wheel speed signal $S_p$ and for the threshold value signal $V_{th}$. The count-up signal and the count-down signal change their binary levels with a time difference $\Delta T=T2-T1\approx T4-T3\approx T6-T5$ - - - (5) that results from a difference between the threshold values $V_1$ and $V_2$ of the comparators 11 and 12. Returning to FIG. 2, the count-up signal is input to an AND circuit 23 together with a signal inverted from a binary open-circuit signal Open that will be described later, and an AND output thereof is fed to an up input of a synchronous up/down counter 31 of the counter unit 30. Likewise, the count-down signal is input to an AND circuit 24 together with a signal inverted from a binary open-circuit signal Short that will be described later, and an AND output thereof is fed to a down input of the synchronous up/down counter 31.

Next, described below are the constitutions and operations of the counter unit 30 and of the D/A conversion unit 40 for processing signals output from the counter unit 30. The synchronous up/down counter 31 which is a 16-bit binary counter receives the clock signals CLK, and is controlled for its counting operation based on the up input/down input. Concretely speaking, the synchronous up/down counter 31 counts up the signals in response to the clock signals CLK when the up input is of a high level (hereinafter the "high level" is referred to as "1" and the "low level" is referred to as "0"), i.e., when the count-up signal is "1", and counts down the signals in response to the clock signals CLK when the down input is "1", i.e., when the count down signal is "1". A parallel binary count code PBC output from the synchronous up/down counter 31 is input to a D/A converter 41 in the D/A conversion unit 40 to generate a corresponding D/A converted output which is an analog signal. The D/A converted output is input to a voltage follower 42 to convert the input/output impedance, thereby to obtain a threshold value signal $V_{th}$ having a voltage level same as that of the D/A converted output and having a low output impedance. The threshold value signal $V_{th}$ is the one obtained by subjecting, to the D/A conversion, a binary value counted up with the count-up signal obtained from the first output of the comparator 11, or is the one obtained by subjecting, to the D/A conversion, a binary value counted down with the count-down signal obtained from the second output of the comparator 12. Therefore, the threshold value signal $V_{th}$ becomes a saw-tooth wave signal shown in FIG. 3 the voltage of which linearly increases when the count-up signal is "1" and linearly decreases when the count-down signal is "0".

Figure 1:
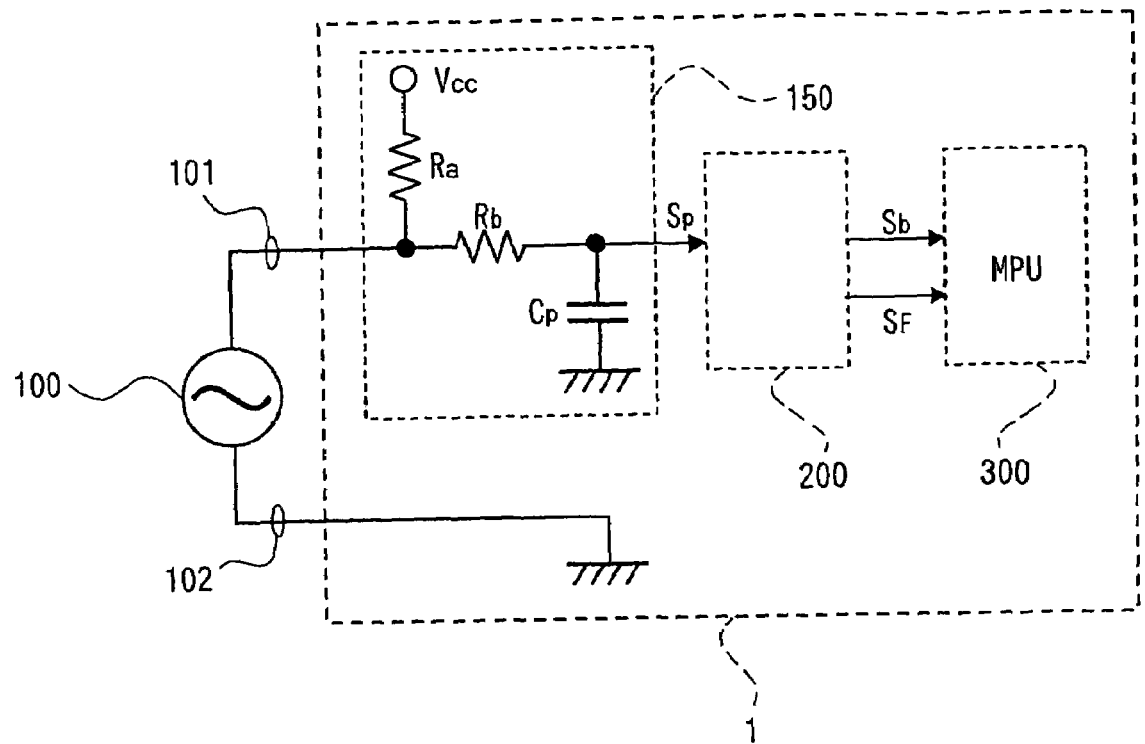
FIG. 1 is a block diagram of a device for detecting the wheel speed according to a preferred embodiment.
Figure 4:
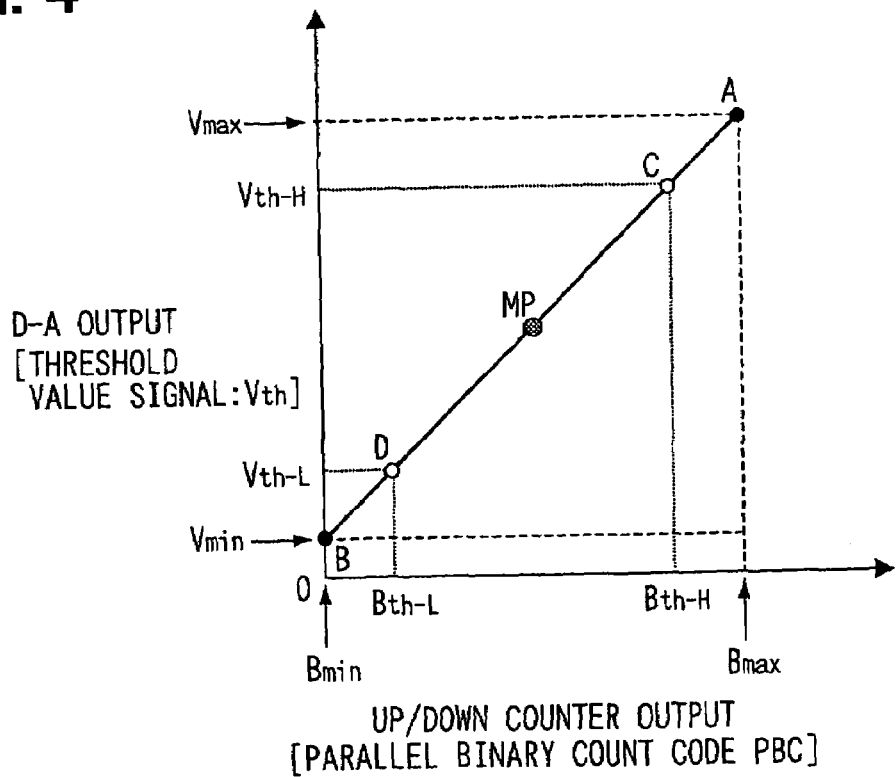
FIG. 4 is a diagram illustrating detection of a fault in a wheel speed sensor.

FIG. 4 illustrates a relationship between the parallel binary count code PBC output from the synchronous up/down counter 31 and the D/A converted output of the D/A converter 41 or the threshold value signal $V_{th}$. When the counter output is a minimum value $B_{min}$, the output of the D/A converter has a minimum value $V_{min}$ of a point B. When the counter output is a maximum value $B_{max}$, the output of the D/A converter has a maximum value $V_{max}$ of a point A, and a central value or an average value of the sine-wave wheel speed signal output from the wheel speed sensor becomes a middle point MP of the line AB. Detection of fault in the open-circuit mode and in the short-circuit mode will now be described with reference to FIGS. 1 and 2.

First, described below is how to detect the fault in the open-circuit mode. If the line of the wheel speed sensor 100 breaks or if two lines 101, 102 connecting the wheel speed sensor 100 to the device for detecting the wheel speed 1 break, then, a voltage level of the wheel speed signal $S_p$ input to the signal processing circuit 200 increases to approach the power source voltage $V_{cc}$, and the comparator 11 that receives the above signal continues to produce the first output of the level "1". Therefore, the synchronous up/down counter 31 continuously receives the up input "1" to continue the count-up, whereby the parallel binary count code PBC of the counted output increases and reaches $B_{max}$ shown in FIG. 4. At this moment, the parallel binary count code PBC of the most significant 9-bit value output from the counter assumes 1FF (=1/1111/1111) which is a maximum $B_{max}$, whereby the AND output Open of the ANDV circuit 32 that has received the 9-bit code assumes "1" to generate an open-circuit mode fault detection output. This is output through a signal output unit 50 that will be described later, and the MPU 300 judges the content (duration time, etc.) thereof to judge whether the fault is that of the open-circuit mode.

Next, described below is how to detect the fault in the short-circuit mode. If the line of the wheel speed sensor 100 is short-circuited or if two lines 101, 102 connecting the wheel speed sensor 100 to the device for detecting the wheel speed 1 are short-circuited, then, a voltage level of the wheel speed signal $S_p$ input to the signal processing circuit 200 decreases to approach the ground potential which is zero, and the comparator 12 that receives the above signal continues to produce the second output of the level "1". Therefore, the synchronous up/down counter 31 continuously receives the Down input "1" to continue the count-down, whereby the parallel binary count code PBC of the counted output decreases and reaches $B_{min}$ shown in FIG. 4. At this moment, the parallel binary count code PBC of the most significant 9-bit value output from the counter assumes 000 (=0/0000/0000) which is a minimum $B_{min}$, whereby the AND output Short of the AND circuit V33 that has received the binary code (1/1111/1111) the polarity of which is inverted from the 9-bit code assumes "1" to generate a short-circuit mode fault detection output. This is output through the signal output unit 50 that will be described later, and the MPU 300 judges the content (duration time, etc.) thereof to judge whether the fault is that of the short-circuit mode.

Next, briefly described below, in connection with the operation of the signal output unit 50, is the operation of the device for detecting the wheel speed 1 in a transient state where the vehicle that has been halted starts traveling. When the wheel starts rotating, a sine-wave wheel speed signal $S_p$ is produced. However, because the speed is very low, the frequency is also very low, and the first output and the second output of the level "1" are continuously produced for a considerably long period of time (e.g., longer than 200 ms). While the count-up is being continued by the first output, therefore, the counted output PBC may reach the point A (FIG. 4) of the maximum value $B_{max}$ and the open-circuit signal may be produced. Or, the counted output PBC may reach the point B (FIG. 4) of the minimum value $B_{min}$ while the count-down is being continued by the second output, and the short-circuit signal may be produced.

The open-circuit signal that happens to be generated is input to an AND circuit 57 through an OR circuit 54 and an OR circuit 56. In this case, the AND product "1" of the open signal "1" and of a signal "1" inverted from a normal signal which is usually "0" "1", is input to a D-type FF 58, latched with the clock signal CLK, and sets the D-type FF 58 to "1" to generate a binary fault detection signal $S_F$. However, when the second output is produced in the next half period of the sine-wave wheel speed signal $S_p$ and the count-down takes place, the counted output PBC starts decreasing to reach the upper-limit operation value $B_{th-H}$ which is a point C in FIG. 4. Here, the AND circuit Y34 that has received the counted output PBC produces the AND output $B_{th-H}$. The signal $B_{th-H}$ passes through an OR circuit 55 to produce a normal signal. Here, the AND circuit 57 that has received a signal "0" inverted from the normal signal and the binary fault detection signal $S_F$ "1" passed through an OR circuit 56, produces an AND output "0", and the D-type FF 58 that has received the AND output "0" is reset to "0" with CLK. As a result, the time in which the binary fault detection signal $S_F$ is produced ("1") is very short (about several tens of milliseconds at the longest). Upon examining this time by the MPU 300, it is easily judged that the fault is not that of the open-circuit mode.

The short signal that is generated while the wheel is rotating at a low speed is input to the AND circuit 57 through the OR circuit 54 and the OR circuit 56. In this case, the AND product "1" of the short signal "1" and of a signal "1" inverted from a normal signal which is usually "0", is input to the D-type FF 58, latched with the clock signal CLK, and sets the D-type FF 58 to "1" to generate a binary fault detection signal $S_F$. However, when the first output is produced in the next half period of the sine-wave wheel speed signal $S_p$ and the count-up takes place, the counted output PBC starts increasing from the point B to reach the lower-limit operation value $B_{th-L}$ at a point D in FIG. 4. Here, the ANDZ circuit 35 that has received the counted output PBC produces the AND output $B_{th-L}$. The signal $B_{th-L}$ passes through an OR circuit 55 to produce a normal signal. Here, the AND circuit 57 that has received a signal "0" inverted from the normal signal and the binary fault detection signal $S_F$ "1" passed through the OR circuit 56, produces an AND output "0", and the D-type FF 58 that has received the AND output "0" is reset to "0" with CLK. As a result, the time in which the binary fault detection signal $S_F$ is produced is examined by the MPU 300 and easily judged that the fault is not that of the short-circuit mode. As mentioned above, when the time in which the binary fault detection signal $S_F$ is occurring is longer than a predetermine period of time (e.g., about 100 ms), it can be judged that a fault of either the open-circuit mode or the short-circuit mode is occurring.

Next, described below is the occurrence of the binary wheel speed signal $S_b$ in connection with the operation of the signal output unit 50. The count-up signal and the count-down signal produced from the counter control unit 20 are input to the signal output unit 50. First, when the D-type FF 53 has not been set to "1", the AND output of the AND circuit 52 that has received the signal "1" inverted from the count-up signal "0" and the count-down signal "1" passed through the OR circuit 51, assumes "1", is input to the D-type FF 53, is latched with the clock signal CLK, and sets the D-type FF 53 to "1" with the rise of the count-down signal ("0"→"1"). Thereafter, when the count-up signal assumes "1", the AND output of the AND circuit 52 that has received the signal "1" of the D-type FF 53 passed through the OR circuit 51 and a signal "0" inverted from the count-up signal, assumes "0", is input to the D-type FF 53, is latched with the clock signal CLK, and resets the D-type FF 53 with the rise of the count-up signal ("0"→"1"). Thus, the binary wheel speed signal $S_b$ that is the output from the D-type FF 53 is produced and its polarity "0"/"1" is inverted by the rise of both the count-up signal and the count-down signal, making it possible to obtain a binary wheel speed pulse signal having an even "0"/"1" continuation time.

Finally, briefly described below is an embodiment of a device for detecting the wheel speed by using a digital low-pass filter (hereinafter referred to as DLPF) of the FIR system or the IIR system. Assuming that an input signal is denoted by X(n), the operated output Y(n) of FIR is expressed by Y(n)=Σ[k=0 to k=n−1]$h_k$·X(n) - - - (11). Further, assuming that a z-conversion of an input signal x is denoted by X(z) and a z-conversion of an output signal y is denoted by Y(z), the operated output Y(z) of IIR is expressed by Y(z)=(Σ[k=0 to k=M]$b_k$·$z^{-k}$){1/(1−Σ[k=1 to k=N]$a_k$·$z^{-k}$)}X(z) - - - (12). Here, $h_k$, $a_k$ and $b_k$ are coefficients for determining the filter characteristics (frequency selectivity, etc.). To fold the input signals, the DLPF of the two systems is constituted by a shift register for storing the input signals in time series and for successively updating them, an MUX (multiplexer) for selecting the steps of the register and for selecting the coefficients corresponding to the steps, an ALU (arithmetic and logic unit) for multiplying the values of the steps by the coefficients to find the sum thereof, and an ACC (accumulator:register) for latching the operated result. These operations can be easily realized by using a CPU or a DSP (digital signal processing). The DLPF features a high signal selectivity to properly pick up desired signals from the input signals on which are superposed induction noise and harmonic components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for detecting a wheel speed comprising:
signal processing means having conversion means for converting a sine-wave output signal of a wheel speed sensor into a binary signal; and
a microcomputer that receives an output signal converted through the signal processing means, wherein the signal processing means has threshold value-determining means that determines a threshold value of the conversion means based on an output of a digital filter;
wherein the threshold value-determining means continuously increases the threshold value during a period in which the sine-wave output signal is greater than the threshold value, and continuously decreases the threshold value during a period in which the sine-wave output signal is smaller than the threshold value.

2. A device for detecting a wheel speed according to claim 1, further comprising open-circuit detection means for detecting an open state in the connection between the wheel speed sensor and the signal processing means.

3. A device for detecting a wheel speed according to claim 1, further comprising short-circuit detection means for detecting a grounded state in the connection between the wheel speed sensor and the signal processing means.

4. A device for detecting a wheel speed according to claim 1, wherein when the vehicle is traveling at a constant speed, the binary wheel speed signal has a pulse duty of 50%, the pulse duty being defined by a ratio of the high-level continuation time to the pulse period.

5. A device for detecting a wheel speed comprising:
signal processing means having conversion means for converting a sine-wave output signal of a wheel speed sensor into a binary signal; and
a microcomputer that receives an output signal converted through the signal processing means, wherein the signal processing means has threshold value-determining means that determines a threshold value of the conversion means based on an output of a digital filter;
wherein the digital filter maintains a value of the binary signal when the sine-wave output signal is passing through a threshold value insensitive zone determined by the threshold value.

6. A device for detecting a wheel speed comprising:
signal processing means having conversion means for converting a sine-wave output signal of a wheel speed sensor into a binary signal;
a microcomputer that receives an output signal converted through the signal processing means, wherein the signal processing means has threshold value-determining means that determines a threshold value of the conversion means based on an output of a digital filter;
a first comparator having the threshold value determined by a threshold value signal that is the output of the digital filter, and producing a first output during a period in which the sine-wave output signal of the wheel speed sensor is greater than the threshold value;
a second comparator for producing a second output during a period in which the sine-wave output signal of the wheel speed sensor is smaller than the threshold value;
an up/down counter for counting up the outputs based on the clock signals having a predetermined clock frequency while the first output is being produced, and for counting down the outputs based on the clock signals while the second output is being produced, to produce a parallel binary count code corresponding to the counted value;
a D/A converter for producing the threshold value signal for determining the threshold value of the comparator in response to the input of the parallel binary count code; and
a digital filter having a logic circuit for operating a logic of the first output and of the second output, and for producing a binary wheel speed signal in which the high level and the low level are equalized in time.

7. A device for detecting a wheel speed according to claim 6, wherein the open-circuit detection means produces a binary open-circuit signal when the parallel binary counted code of the up/down counter has reached a maximum value.

8. A device for detecting a wheel speed according to claim 6, wherein the short-circuit detection means produces a binary short-circuit signal when the parallel binary counted code of the up/down counter has reached a minimum value.

* * * * *